United States Patent [19]
Mills

[11] Patent Number: 5,669,275
[45] Date of Patent: Sep. 23, 1997

[54] CONDUCTOR INSULATION REMOVER

[76] Inventor: Edward Otis Mills, 4325 Lynn Burke Rd., Monrovia, Md. 21770

[21] Appl. No.: 516,589

[22] Filed: Aug. 18, 1995

[51] Int. Cl.$^6$ .............................. B21F 13/00; B26B 27/00
[52] U.S. Cl. ............................. 82/47; 30/90.1; 30/91.2
[58] Field of Search ..................... 30/90.1, 91.2, 30/93, 94, 95, 96, 90.8, 90.7; 81/9.4, 9.41; 82/46, 47, 70.1, 70.2, 92

[56] References Cited

U.S. PATENT DOCUMENTS

| | | |
|---|---|---|
| 2,817,255 | 12/1957 | Lormeau . |
| 3,022,574 | 2/1962 | Green et al. ......................... 30/91.2 |
| 3,122,036 | 2/1964 | Flower et al. ....................... 30/91.2 |
| 3,204,495 | 9/1965 | Matthews . |
| 3,284,895 | 11/1966 | Selander et al. . |
| 3,568,314 | 3/1971 | Adams . |
| 3,686,982 | 8/1972 | Bull . |
| 3,688,404 | 9/1972 | Muller ............................... 30/91.2 |
| 4,104,791 | 8/1978 | Sunahara . |
| 4,179,804 | 12/1979 | Maytham . |
| 4,769,910 | 9/1988 | Noon . |
| 4,777,712 | 10/1988 | Dyck et al. . |
| 4,926,722 | 5/1990 | Sorensen et al. . |
| 5,074,043 | 12/1991 | Mills ............................... 30/90.1 |
| 5,161,787 | 11/1992 | Hobday . |

OTHER PUBLICATIONS

Brochure from "Ripley Company" promoting Utility Tool WS10 & WSK10 Mid–Span Strippers.
Brochure from "Greenlee Tool Co." promoting 1905 Cable Stripper.

*Primary Examiner*—Hwei-Siu Payer
*Attorney, Agent, or Firm*—Lowe, Price, LeBlanc & Becker

[57] ABSTRACT

An apparatus and method for removing insulation from a conductor includes a body, a blade mounted to the body and a movable jaw. The body includes a fixed jaw and a blade support pivotally mounted to the body at the fixed jaw. The blade is releasably secured to the blade support. A one-way drive mechanism incrementally advances the movable jaw toward the blade. An actuable release lever permits free movement of the movable jaw away from the blade upon actuation thereof. Pivotal movement of the blade support selectively positions the blade with the cutting edge substantially perpendicular to a longitudinal axis of the conductor and with the cutting edge at a predetermined acute angle with respect to the longitudinal axis of the conductor. The conductor is gripped between the movable jaw and the blade so that the cutting edge penetrates the insulation, whereupon rotation of the apparatus about the conductor with the cutting edge perpendicular to the longitudinal axis of the conductor results in a crosswise scoring of the perimeter of the insulation. Rotation of the apparatus about the conductor with the cutting edge at the acute angle results in helical scoring of the insulation to permit removal thereof.

29 Claims, 7 Drawing Sheets

CONDUCTOR INSULATION REMOVER

TECHNICAL FIELD

The invention relates to electric conductors and strippers for removing insulation therefrom and, more particularly, to devices and methods for removing insulation from a primary service conductor in electrical power transmission.

BACKGROUND ART

Electric power systems include equipment to generate, transmit and distribute electric energy to residential, industrial, commercial and rural users. Generating stations or power plants use fuel, water power, or nuclear reaction to produce alternating-current (AC) 3-phase, 60-cycle electric power. The output voltage from a typical electric generator is in the range of 11,000 to 20,000 volts. The output voltage from the generators is stepped up by transformers for transmission. Transmission systems supply electric power from the generating stations to load areas, typically using high transmission voltages in the range of 110,000 to 345,000 volts. The high transmission voltages are stepped down by bulk-power substations, providing power to distribution substations over subtransmission lines at levels of 23,000 to 69,000 volts.

The distribution substation provides power over primary distribution circuits operated at between 4,160 and 25,000 volts using primary feed conductors. Primary feeders often use either overhead or buried-cable installations at 7,600 volts to provide electric power from the distribution substations to load areas. Conveniently located transformers step down the primary feed voltage for low-voltage distribution over secondary lines in the 115 to 230 voltage utilization range.

The majority of distributions systems in use are placed overhead, supported by poles or towers. Usually, bare primary and secondary conductors are strung from pole to pole. The conductors are usually multilayered, concentrically stranded aluminum cables. Additional tensile strength is provided by either a core of steel strands or by inclusion of strands of a strong aluminum alloy. Alternatively, underground distribution systems are installed in congested areas and for aesthetic reasons.

In areas where there are a lot of trees, the trees are prone to coming in contact with the overhead conductors, often causing damage to bare conductors resulting in power outages. To minimize such damage, a "tree wires," i.e., conductors having a thick insulation jacket, are installed. Although tree wire is much more expensive than bare wire, the costs are offset by the reduced down time due to damaged conductors.

To repair a tree wire, it is necessary to remove the thick insulation, either at the end of the tree wire or midway. Because the insulation is very thick and hard, it is difficult to remove with prior art tools. For instance, the prior art tools require two hands to cut a groove out of the insulation. The prior art tools are relatively expensive tools and are easily broken. The blades on the prior art tools are not replaceable; hence, the tools are not very cost-effective. Additionally, use of the prior art tools often damages the conductor since it is difficult to control the penetration of the blade into the conductor.

I have invented a prior art safety-cable jacket remover, disclosed in U.S. application Ser. No. 07/617,709, now U.S. Pat. No. 5,074,043, the disclosure of which is hereby incorporated by reference. The safety-cable jacket remover of the '043 patent particularly suited for underground buried cables, includes a tubular housing, a knife edge and a dial for positioning the blade. In an "open" position the blade is retracted from the housing to permit insertion of a cable into the housing. Rotation of the dial to a "CUT" position positions the blade on the cable, the blade substantially perpendicular to the cable, so that rotation of the remover circumferentially scores the cable jacket. Rotating the dial to a "strip" position angles the blade with respect to the cable so that rotation of the remover on the cable helically scores the cable jacket while the device tracks to the end and off the cable. The cable jacket is then removed by unwrapping the resultant helical strip of jacket from the cable end to the circumferential score line. The cable jacket remover is made of a plastic such as polyvinylchloride pipe to reduce a shock hazard and includes a scale for measuring the terminal length of cable to be stripped. A blade carrier restricts penetration of the knife edge into the cable jacket to avoid cutting through the cable jacket into underlying structure of the cable. Because this jacket remover is tubular, it must be slid over an end of the cable to permit stripping; hence, it is unsuitable for use on an intermediate portion of a conductor. Additionally, the jacket remover is not capable of removing the very thick insulation found on tree wire.

Other prior art devices, as disclosed, for instance, in U.S. Pat. Nos. 4,769,910 to Noon and 4,179,804 to Maytham, and require more than one hand to sufficiently clamp the tool against the cable to permit removal of the thick insulation. These devices also have the disadvantage of a blade being exposed and liable to cause injury.

Accordingly, an object of the invention is to accurately score conductor insulation without nicking or otherwise damaging the underlying conductor.

Another object of the invention is to provide a conductor insulation remover made of non-conductive materials to which minimize the hazard of shock to the user of the device.

A further object of the invention is to score the insulation using only one hand.

Another object of the invention is to provide a conductor insulation remover which does not have an exposed blade liable to cause injury.

A still further object of the invention is to selectively score insulation circumferentially and helically to permit easy removal of the insulation by unwinding of the helical portion up to the full circumferential score line.

Another object of the invention is to provide a conductor insulation remover with means to adjust the depth of penetration of a blade to accommodate scoring or removal of conductor insulations of varying thickness.

A still further object of the invention is to provide a conductor insulation remover which accommodates a range of conductor sizes without requiring calibration or adjustment.

DISCLOSURE OF THE INVENTION

According to a preferred embodiment of the invention, a device for removing insulation from a conductor includes a body, a blade mounted to the body, and a movable jaw. A one-way drive mechanism incrementally advances the movable jaw toward the blade. An actuable release lever permits free movement of the movable jaw away from the blade upon actuation thereof. The conductor is gripped between the movable jaw and the blade so that the cutting edge penetrates the insulation, whereupon rotation of the apparatus about the conductor results in scoring of the perimeter of the insulation to permit removal thereof.

According to another aspect of the invention, the body includes a fixed jaw and a blade support pivotally mounted to the body at the fixed jaw. The blade is releasably secured to the blade support.

In a preferred embodiment, pivotal movement of the blade support selectively positions the blade with the cutting edge substantially perpendicular to a longitudinal axis of the conductor and with the cutting edge at a predetermined acute angle with respect to the longitudinal axis of the conductor.

According to another aspect of the invention, a directional bar is rigidly mounted to the blade support. Movement of the directional bar permits pivoting of the blade support relative to the fixed jaw.

The device further includes a means for biasing the movable jaw away from the fixed jaw upon actuation of the release lever. Preferably, the biasing means is an extension spring.

According to another aspect, the device includes a slide bar rigidly attached to the movable jaw at a first end thereof. The slide bar is movable to bring the movable jaw toward and away from the fixed jaw. In this embodiment, the extension spring is preferably mounted at one end to the fixed jaw and at the other end to the slide bar. It is also preferred that the slide bar include a u-shaped recess at a second end thereof adapted to receive the other end of the extension spring.

The body preferably includes a fixed jaw to which the blade is mounted. The fixed jaw includes a projection to which the extension spring is mounted.

Preferably, the movable jaw includes a PVC hook portion mounted thereto to facilitate rotation of the apparatus about the conductor, in which case the conductor is received between the PVC hook portion and the blade.

According to another aspect, the device includes a trigger handle pivotally mounted to the body. The one-way drive mechanism includes a driving lever permitting incremental advancement of the movable jaw upon pivotal movement of the trigger handle. In this embodiment, it is preferred that the slide bar be rigidly attached to the movable jaw at a first end thereof such that the slide bar is movable to bring the movable jaw toward and away from the fixed jaw. The driving lever permits incremental advancement of the slide bar upon pivotal movement of the trigger handle.

Further according to this embodiment, incremental advancement of the slide bar closes said movable jaw relative to the blade.

In accordance with another preferred embodiment of this invention, a device includes a body, a fixed jaw mounted to the body and a blade mounted to the fixed jaw. A trigger handle is pivotally mounted to the body. A movable jaw is mounted on one end of a slide bar, with the slide bar being movable to bring the movable jaw toward and away from the fixed jaw. One-way drive means is provided for incrementally advancing the slide bar and attached movable jaw toward the fixed jaw. The one-way drive means includes a driving lever permitting incremental advancement of the slide bar upon pivotal movement of the trigger handle and an actuable release lever, the actuable release lever permitting free movement of the slide bar upon actuation thereof. A means for biasing the movable jaw away from the fixed jaw upon actuation of the release lever is also provided.

According to another aspect, a blade support is pivotally mounted to the body, with the blade being rigidly mounted to the blade support. Also preferred is a means for pivoting the blade support relative to the body. Preferably, the blade support includes two grips within which the blade is releasably secured, with the blade is releasably mounted to the blade support.

According to yet another preferred embodiment of this invention, a device for removing insulation from a conductor includes a body, a blade mounted to the body and having a cutting edge, and a movable jaw. A mechanism incrementally advances the movable jaw toward the blade. The conductor is gripped between the movable jaw and the blade so that the cutting edge penetrates the insulation, and rotation of the apparatus about the conductor results in scoring of the perimeter of the insulation to permit removal thereof.

Preferably, the body includes a fixed jaw and a blade support pivotally mounted to the body at the fixed jaw. The blade is releasably secured to the blade support.

An extension spring biases the movable jaw away from the fixed jaw upon actuation of the release lever.

Preferably, a slide bar is rigidly attached to the movable jaw at a first end and includes a u-shaped recess at a second end thereof. The slide bar is movable to bring the movable jaw toward and away from the fixed jaw. The extension spring is mounted at one end to the fixed jaw and at the other end to the u-shaped recess of the slide bar.

The body preferably includes a fixed jaw to which the blade is mounted. The fixed jaw includes a projection to which the extension spring is mounted.

According to yet another aspect, a slide is bar rigidly attached to the movable jaw at a first end thereof. The slide bar is movable to bring the movable jaw toward and away from the fixed jaw.

In accordance with a further aspect of the invention, a trigger handle is pivotally mounted to the body. The one-way drive mechanism includes a driving lever permitting incremental advancement of the movable jaw upon pivotal movement of the trigger handle.

According to a further aspect of the invention, a device for removing insulation from a conductor includes a fixed jaw, a blade support pivotally mounted to the fixed jaw, and a blade releasably secured to the blade support. The blade has a cutting edge. The device also includes a movable jaw and a mechanism for advancing the movable jaw toward the blade. A blade positioning mechanism is provided for selectively positioning the blade with the cutting edge substantially perpendicular to a longitudinal axis of the conductor and with the cutting edge at a predetermined acute angle with respect to the longitudinal axis of the conductor. The conductor is gripped between the movable jaw and the blade so that the cutting edge penetrates the insulation. Rotation of the apparatus about the conductor results in scoring of the perimeter of the insulation to permit removal thereof.

Preferably, selectively positioning the cutting edge at the predetermined acute angle results in helical scoring of the perimeter of the insulation.

The body preferably includes a fixed jaw. The blade positioning mechanism includes a blade support pivotally mounted to the body at the fixed jaw and a directional bar rigidly mounted to the blade support. The blade is releasably secured to the blade support. Movement of the directional bar permits pivoting of the blade support relative to the fixed jaw.

According to another aspect of the invention, a method is provided for removing insulation from a conductor using an apparatus including a body, a blade mounted to the body and having a cutting edge, a movable jaw connected to the body, a one-way drive mechanism attached to the body to incrementally advance the movable jaw toward the blade, and an actuable release lever permitting free movement of the movable jaw away from the blade upon actuation thereof. The method comprises the steps of positioning the apparatus so that the conductor is disposed between the movable jaw and the blade, incrementally driving the one-way drive mechanism until the apparatus grips the conductor, rotating the apparatus about the conductor to score the perimeter of the insulation, and actuating the release lever to release the conductor from the apparatus.

It is preferred that the apparatus includes a blade support pivotally mounted to the body and to which the blade is mounted, and that the method further includes the steps of pivoting the blade support so that the cutting edge is located at an acute angle relative to a longitudinal axis of the conductor, incrementally driving the one-way drive mechanism until the apparatus again grips the conductor, rotating the apparatus about the conductor to helically score the perimeter of the insulation, actuating the release lever to release the conductor from the apparatus, and removing the insulation from the conductor.

The above and other objects, features and advantages of the present invention will become apparent from the following description and the appended claims taken in conjunction with accompanying drawings.

BEST MODE FOR CARRYING OUT THE INVENTION

Figure 1:
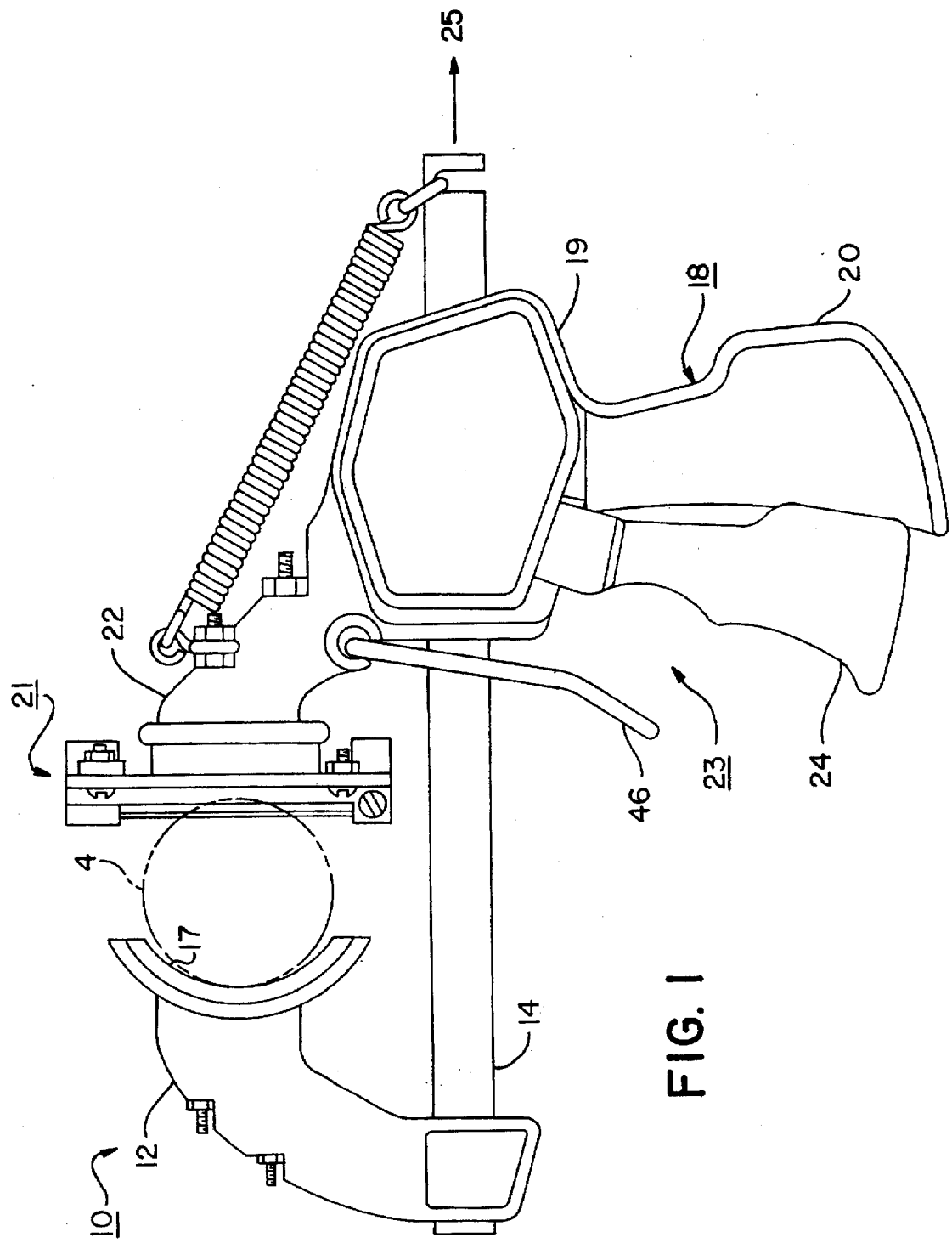
FIG. 1 is a front elevation view of the conductor insulation remover of the present invention, in the clamped position.
Figure 2:
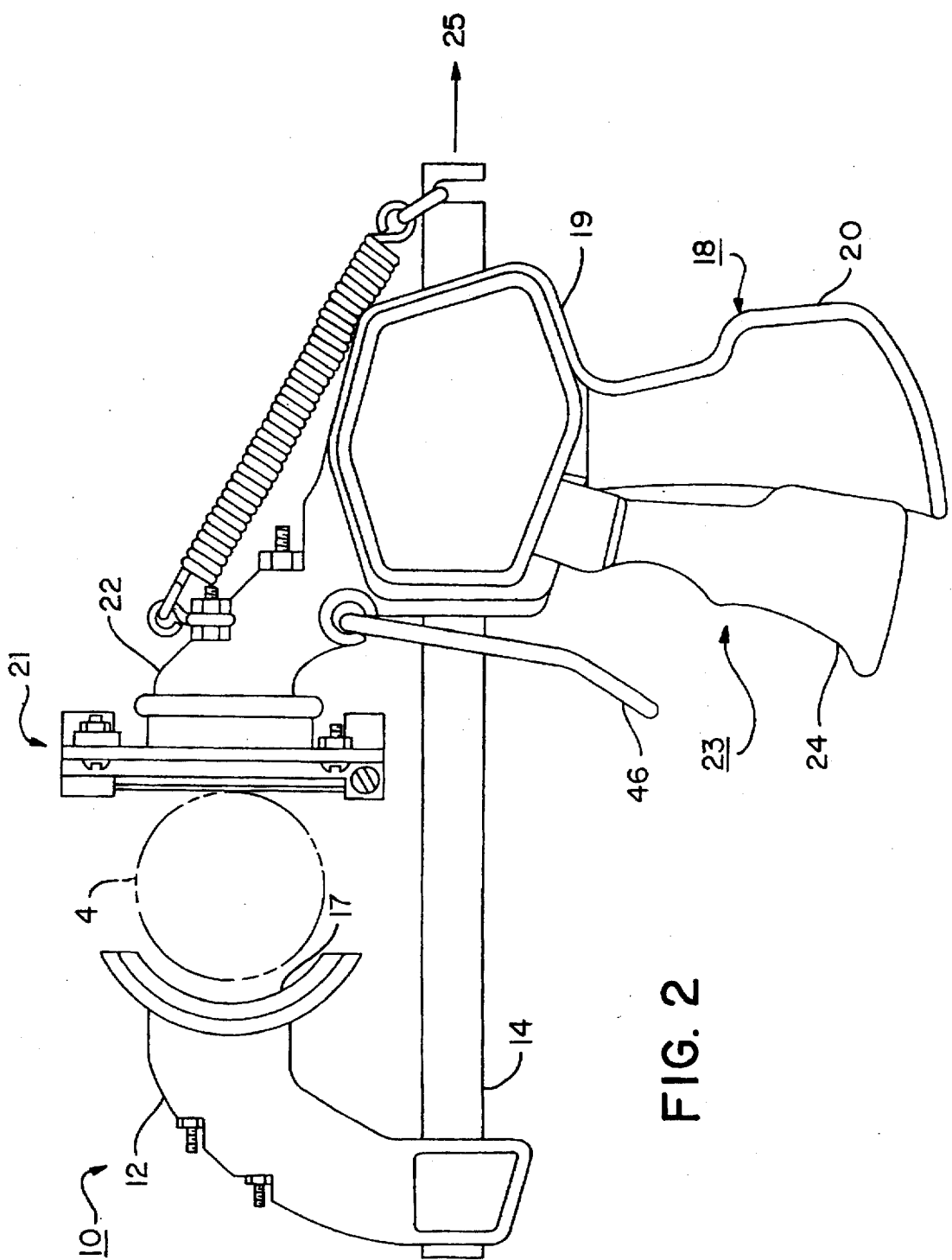
FIG. 2 is a front elevation view of the conductor insulation remover of the present invention, in the open position.

Referring to the Figures, a conductor insulation remover, shown generally as 10, includes a handle/grip assembly 18 permitting trigger-movement of a movable jaw 12 toward a fixed jaw 22 to grip a conductor, shown in phantom as 4, between the two jaws 12, 22. When so gripped, a blade assembly 21, mounted to fixed jaw 22, penetrates scores the insulation of conductor 4. Handle/grip assembly 18 permits one-handed gripping of conductor 4. Additionally, an actuable release lever 46 permits, upon actuation thereof, free movement of movable jaw 12 away from blade assembly 21, as will be described.

More particularly, handle/grip assembly 18 includes a body 19 with which fixed jaw 22 is integral. Movable jaw 12 connected to a slide bar 14. Slide bar 14 is supported by and is slidable relative to handle/grip assembly 18. A conductor support 17, preferably with a semi-cylindrical contour and preferably made of PVC, is mounted to (as depicted) or, alternately, integral with movable jaw 12 and is adapted to conform to conductor 4. Blade assembly 21 is secured to fixed jaw 22. A one-way incremental drive mechanism 23 is provided to drive slide bar 14 in the direction of arrow 25, causing movable jaw 12 to close in on blade assembly 21 to grip conductor 4 between the conductor support 17 and the blade assembly 21. Upon actuation, actuable release lever 46 permits free movement of movable jaw 12 away from blade assembly 21 in the direction opposite to the direction of arrow 25.

Figure 5:
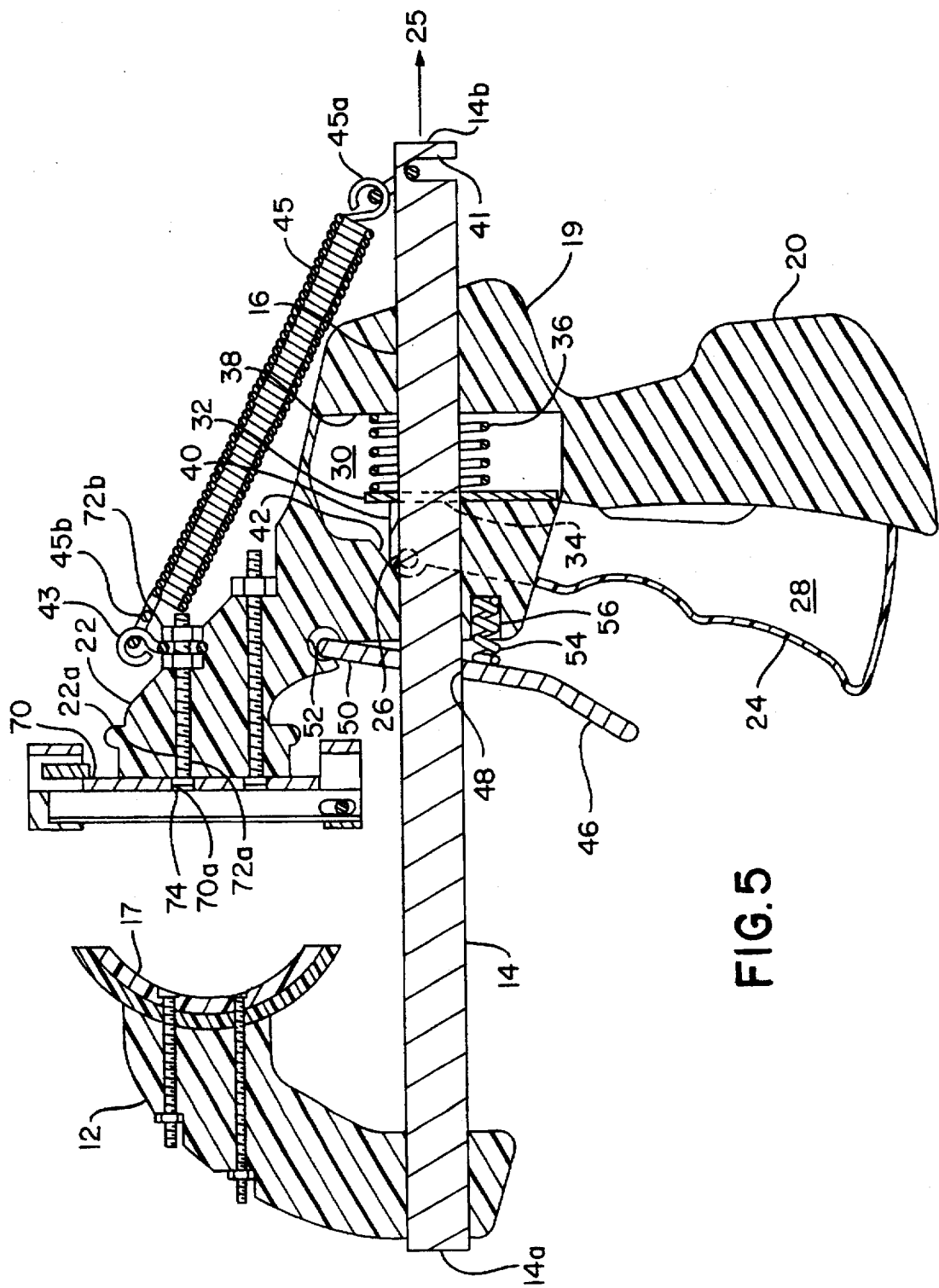
FIG. 5 is a sectional view taken along lines 5—5 of FIG. 4.

Body 19 of handle/grip assembly 18 includes a slot 16 (depicted in FIG. 5) adapted to receive slide bar 14. A handgrip 20 is attached to the body 19 on one side of the slot 16 opposite of fixed jaw 22. A trigger handle 24 is pivotally mounted to the body 19 adjacent the slot 16 by means of a pivot pin 26. As best depicted in FIG. 5, a cavity 28 is formed in trigger handle 24 adapted to receive at least a portion of handgrip 20 therein. Alternatively, handgrip 20 may be hollow to receive trigger handle 24 therein. These configurations of handgrip 20 and trigger handle 24 permit one-handed, pivotal, trigger motion of trigger handle 24 relative to handgrip 20 to drive slide bar 14, as will be described.

A second cavity 30 in body 19 divides slot 16. A driving lever 32 is suspended on slide bar 14. A hole 34 is provided in driving lever 32 for receiving slide bar 14 therein. A spring 36 is compressed between driving lever 32 and a surface 38 of cavity 30 urging driving lever 32 against an upper end 40 of trigger handle 24. Upper end 40 of trigger handle 24 is forked and straddles slide bar 14. Force of spring 36 urges trigger handle 24 against an inner surface 42 of body 19 thus providing a standby condition. In the standby condition, driving lever 32 is positioned perpendicular to the direction of motion, indicated by arrow 25, of slide bar 14 when in operation. Any motion of handle 24 about pivot pin 26 in the direction of arrow 25 is accomplished against the bias of spring 36.

Release lever 46 includes an opening 48 through which slide bar 14 passes. One end 50 of the release lever 46 is pivotally captured in a recess 52 within body 19 such that release lever 46 may pivot within constraints defined by the surfaces of recess 52 and by binding of release lever 46 with slide bar 14 when the edges of opening 48 in release lever 46 engage the surface of slide rod 14. A spring 54 seats in a recess 56 in body 19 and biases the free end of release lever 46 away from trigger handle 24. The biased position of release lever 46 is limited by the binding interference between opening 48 of release lever 46 with the slide bar 14.

It should be noted that in the standby position depicted in FIG. 5, driving lever 32 is substantially perpendicular to the longitudinal axis of slide bar 14, whereas the portion of release lever 46 which engages slide bar 14 is traverse to the longitudinal axis of the slide bar but not perpendicular thereto. In this condition, if a force is applied to moving jaw 12 in the direction indicated by arrow 25, slide bar 14 is free to move through hole 34 in driving lever 32 and through spring 36. Because release lever 46 is free to pivot against the bias of spring 54 when force is applied on moving jaw 12 in the direction of arrow 25, release lever 46 presents no obstacle to this motion of slide bar 14 and moving jaw 12 may be advanced continuously toward fixed jaw 22.

Additionally, in the standby position as depicted in FIG. 5, if a force is applied to movable jaw 12 in the direction opposite to the direction of arrow 25, the edges of opening 48 in release lever 46 bind against the surface of slide bar 14 and it is not possible, without further action, to withdraw moving jaw 12 farther away from fixed jaw 22, as described more fully hereinafter. Compression of spring 56 by pressing on release lever 46 in the direction of arrow 25, allows withdrawal of slide bar 14 and movable jaw 12 away from fixed jaw 22. This force brings the end 50 of release lever 46 into perpendicularity with the direction of intended motion of slide bar 14. Slide bar 14 is then free to slide in either direction through opening 48 in release lever 46.

Slide bar 14 includes two ends 14a, 14b. End 14a is connected to movable jaw 12. A transverse u-shaped recess 41 is disposed at end 14b. An eyelet 43 is rigidly mounted to body 19 in the vicinity of fixed jaw 22. An external extension spring 45 is installed with a first end 45a secured in u-shaped recess 41 and a second end 45b secured to eyelet 43. Extension spring 45 pulls end 14b of slide bar 14 toward fixed jaw 22 so as to urge movable jaw 12 away from blade assembly 21.

Trigger handle 24 is squeezed in the direction indicated by arrow 25 to incrementally advance slide bar 14 with its attached movable jaw 12 toward fixed jaw 22. When handle 24 is squeezed between a user's hand (not shown) and handgrip 20, pivoting occurs about pivot pin 26 and the end 40 of trigger handle 24 moves in the direction of arrow 25. This causes driving lever 32 to pivot about its upper end (FIG. 5), so that driving lever 32 is no longer perpendicular to the direction of arrow 25 of intended motion of slide bar 14. Pivoting driving lever 32 compresses spring 36 and also causes the edges of hole 34 through driving lever 32 to bind against the surface of slide rod 14. Binding occurs because driving lever 32 is no longer perpendicular to the direction of arrow 25 of intended motion of slide bar 14. Further motion of trigger handle 24 causes driving lever 32 to translate in the direction of arrow 25. This motion further compresses spring 36 and in the process, by means of the binding interference between lever 32 and slide bar 14, advances slide bar 14 and its connected movable jaw 12 toward fixed jaw 22. Action of trigger handle 24 to move movable jaw 12 toward fixed jaw 22 is accomplished against the urging of extension spring 45. The maximum distance of advance of movable jaw 12 with one stroke of trigger handle 22 is limited when spring 36 is fully compressed or, in an alternative construction, handle 24 strikes the inner surface of handgrip 20.

However, the stroke of trigger handle 24 can be through any lesser arc, thereby diminishing the distance movable jaw 12 travels in a single stroke in proportion to the angle of the trigger handle stroke. Additional strokes may be applied to trigger handle 42 of any magnitude until conductor 4 is firmly gripped between jaws 12, 22.

After trigger handle 24 is fully pivoted in the direction of arrow 25 about pivot pin 26, release of trigger handle 24 causes the return of trigger handle 24, driving lever 32 and spring 36 to the position of FIG. 5 as a result of the compressive forces in spring 36 urging the components toward movable jaw 12. In the depicted embodiment (FIG. 5) in accordance with the invention, the slide bar 14 has a rectangular cross-section. In alternative embodiments in accordance with the invention, the slide bar 14 may be any shape, for examples, square, round, triangular, and the openings 34, 48 in the levers 32, 46, respectively are appropriately shaped for proper binding interference with the slide bar 14.

Figure 6:
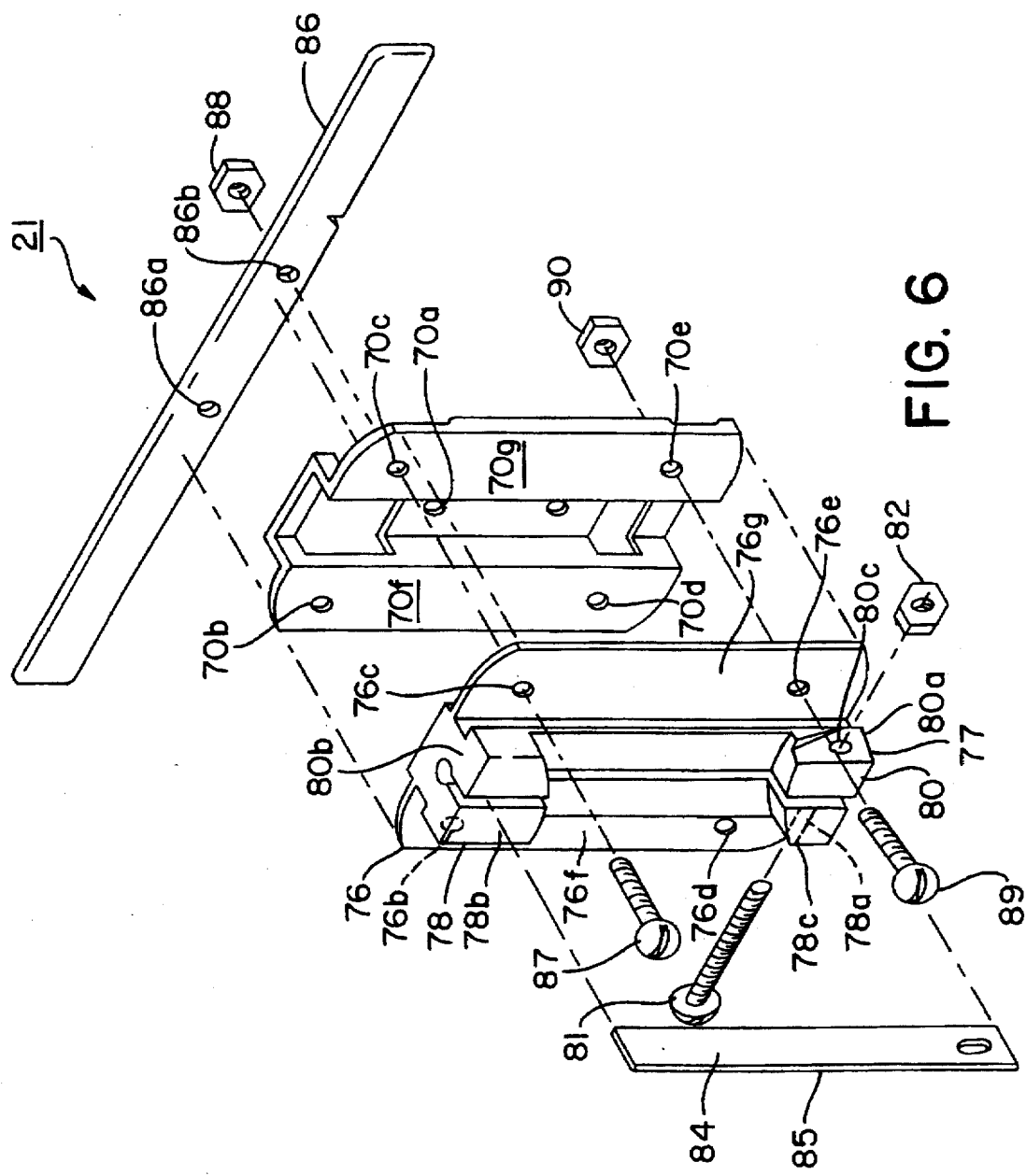
FIG. 6 is an exploded perspective view of a blade assembly.

Blade assembly 21 is depicted in detail in FIG. 6. A base 70 includes a countersunk hole 70a for pivotal attachment to fixed jaw 22. More specifically, referring to FIG. 5, fixed jaw 22 includes an elongated through hole 22a. Base 70 is positioned relative to fixed jaw 22 so as to enable a screw and nut combination 72a, 72b to be installed through holes 70a, 22a, providing a pivot point 74. This one-point attachment permits blade assembly 21 to pivot relative to fixed jaw 22 at pivot point 74. Referring again to FIG. 6, a plurality of holes 70b, 70c, 70d, 70e, are preferably located on raised flanges 70f 70g of base 70.

A vise plate 76 includes an integral projecting vise 77. Two grips 78, 80 are provided on vise 77, each grip including two upstanding legs 78a, 78b and 80a, 80b, respectively. Each leg 78a, 80a includes a through hole 78c, 80c adapted to receive a bolt 81 and nut 82. Tightening of bolt 81 and nut 82 causes grips 78, 80 to be biased toward each other. A blade 84 including a knife edge 85 is received and clamped between grips 78, 80 when bolt 81 and nut 82 are so tightened. It will be appreciated by one skilled in the art that vise 77 permits the easy removal of dull, spent blades with a replacement blade.

A plurality of holes 76b, 76c, 76d, 76e are preferably located on raised flanges 76f, 76g of vice plate 76. An elongated directional bar 86 includes a pair of holes 86a, 86b. Holes 86a, 86b may be aligned with two holes 70b, 70c in base 70 and two holes 76b, 76c in vise plate 76. A first plurality of bolt/nut combinations 87, 88 secure base 70, vise plate 76 and directional bar 86 together at holes 70b, 76b and 86a and at holes 70c, 76c and 86b. A second plurality of bolt/nut combinations 89, 90 secure vise plate 76 to base 70 at the remaining holes 70d, 76d and 70e, 76e. It can thus be appreciated by one skilled in the art that base 70, vise plate 76 and directional bar 86 are rigidly secured to one another and pivotally secure to fixed jaw 22.

Figure 7:
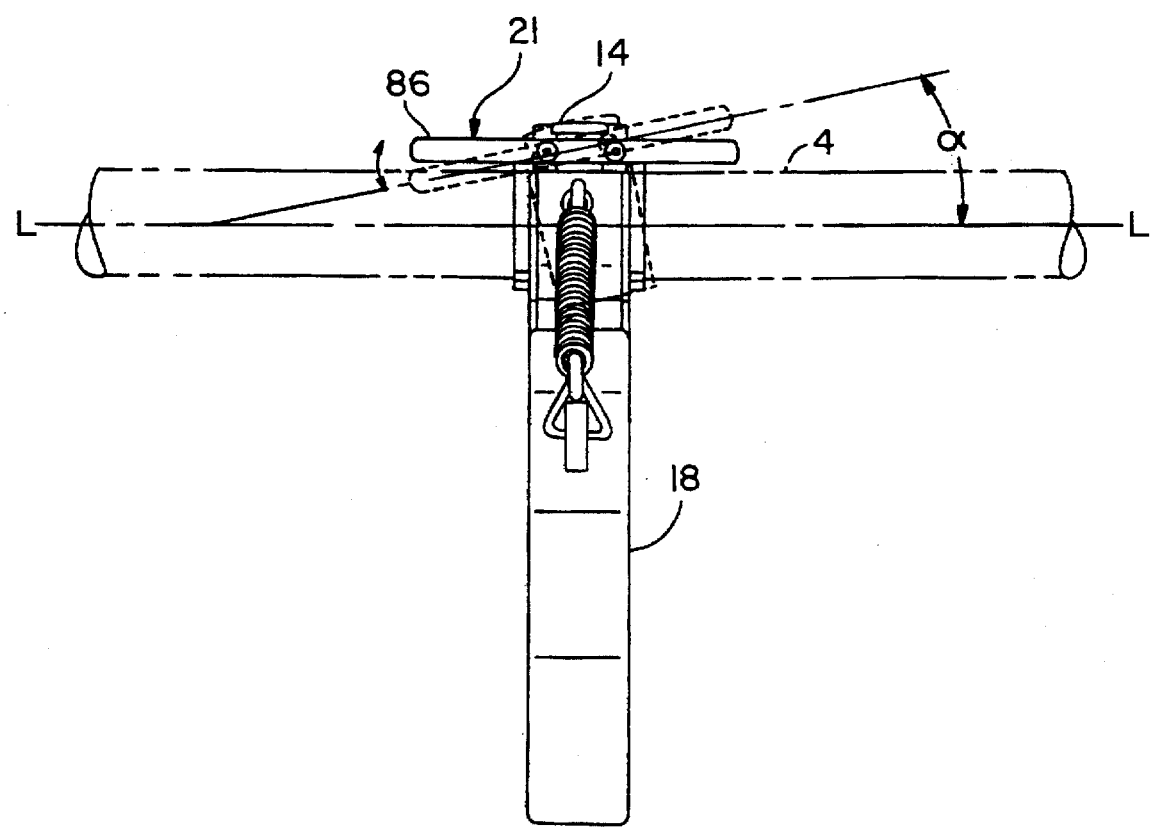
FIG. 7 is right end view, similar to FIG. 4, depicting a blade positioning assembly.
Figure 8:
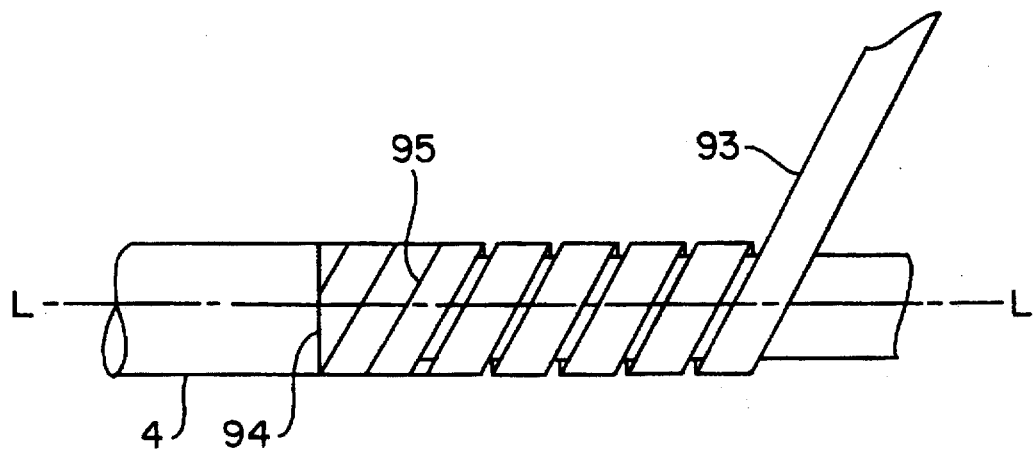
FIG. 8 is a side view of a conductor such as a tree wire with the insulation helically scored and partially unwrapped for removal.

As best seen in FIG. 7, directional bar 86 can be manipulated so as to pivot blade assembly 21 at pivot point 74 relative to handle/grip assembly 18. Blade assembly 21 can be positioned perpendicular to the longitudinal axis L—L of conductor 4, the resulting cut being a crosswise cut. Alternatively, the blade assembly 21 can be pivoted at an angle α with respect to longitudinal axis L—L of conductor 4 to helically score the conductor for easy removal of the insulation 93. Angle α is preferably approximately 5° to 10°. The blade assembly 21 in this position is depicted in FIG. 7 by hidden lines. The resulting crosswise and helical cuts are shown in FIGS. 8 and 9.

Operation of the conductor insulation remover is described with reference to FIGS. 5, 8 and 9. Release lever 46 is actuated to release movable jaw 12 away from fixed jaw 22 with the assistance of extension spring 45. The remover is positioned around conductor 4 so that conductor support 17 at least partially surrounds conductor 4 with blade assembly 21 located opposing the conductor support 17. Trigger handle 24 is alternately squeezed and released to incrementally advance slide bar 14 with its attached movable jaw 12 toward fixed jaw 22 until knife edge 85 of blade 84 sufficiently penetrates the insulation 93 of conductor 4. The conductor insulation remover 10 is then rotated one complete revolution about conductor 4 to score a circumferential line 94 (FIG. 8) about insulation 93 of the conductor. If, at any time, conductor insulation remover loosens from conductor 4, trigger handle 24 may again be squeezed to ensure sufficient penetration of the knife edge in insulation 93.

Directional bar 86 is then pivoted so that knife edge 85 of blade 84 is positioned at angle α relative to longitudinal axis L—L of conductor 4. If necessary because of interference between blade 84 and insulation 93, conductor insulation remover 10 may first be released from conductor 4 by actuating release lever 46 prior to pivoting directional bar 86, whereupon conductor 4 is again secured within the conductor insulation remover 10 by squeezing and releasing trigger handle 24. Conductor insulation remover 10 is again rotated about conductor 4 so that a spiral band 95 is scored along the length of the insulation 93 to the end of the insulation. As conductor insulation remover 10 is rotated, it gradually moves off conductor 4, tracking along spiral band 95 formed by blade assembly 21. When conductor insulation remover 10 has tracked off the length of conductor 4, insulation 93 can be removed by unwinding the insulation in a direction opposite the spiral, unwinding from the end of the conductor toward the initial circumferential score line 94.

Figure 9:
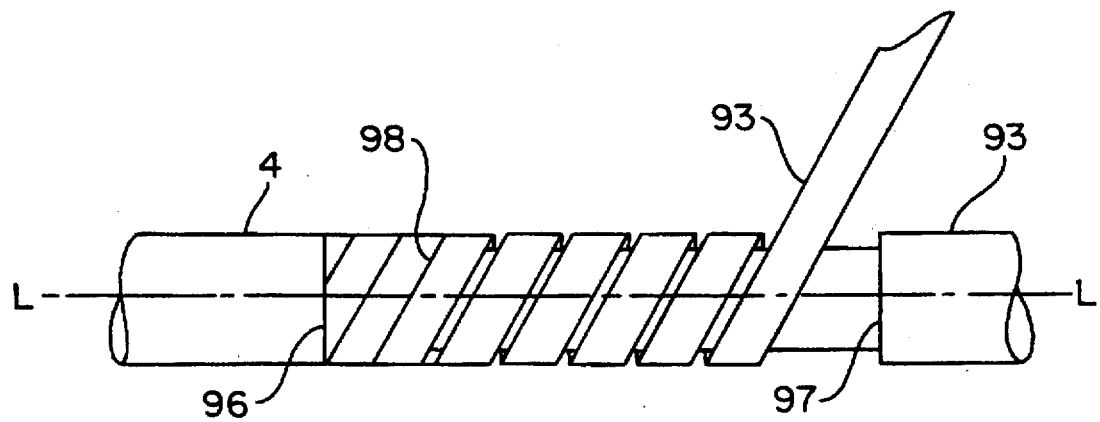
FIG. 9 is a side view of a conductor such as a tree wire with an intermediate span of insulation helically scored and partially unwrapped for removal.

In a similar manner, as depicted in FIG. 9, conductor insulation remover 10 can be used to strip the insulation off of conductor 4 at an intermediate point. To accomplish this, a first circumferential score line 96 is made as described above. Conductor insulation remover 10 is released from conductor 4 by actuating release lever 46, whereupon movable jaw 12 is pushed out of engagement with conductor 4 by action of extension spring 45. Conductor insulation remover is relocated to a second position and trigger handle 24 is alternately squeezed and released to incrementally advance slide bar 14 with its attached movable jaw 12 toward fixed jaw 22. Knife edge 85 of blade 84 again penetrates the insulation 93 of conductor 4. The conductor insulation remover 10 is again rotated one complete revolution about conductor 4 to score a second circumferential line 97 (FIG. 9) about insulation 93 of the conductor. Directional bar 86 is pivoted, and conductor insulation remover is rotated about conductor 4 to produce spiral band 98. Finally, insulation 93 is removed by unwinding the insulation from the conductor.

In summary, when a conductor is to be clamped between the jaws, 12, 22, the movable jaw 12 can be advanced toward the fixed jaw 26 either in one continuous motion, merely by pushing in the direction of the arrow 25 on the movable jaw 22 or, by operating the trigger handle 24 in a series of strokes of length to be determined by the user. Large strokes may be used at first and small strokes later as the desired pressure is applied to the conductor. During this advancing operation, the release lever 46 prevents any backward motion of the slide bar 14 after each advance has been completed. While the release lever 46 holds the bar 14, the trigger handle 24 is released. The spring 36 then returns the handle 24 and driving lever 32 to the positions of FIG. 5, ready for another stroke. At any time when the user desires to retract the movable jaw 12 away from the fixed jaw 22, for example, to release a conductor or to open the bar clamp to receive a conductor, it is only necessary to compress the spring 54 by pressing on the release lever 46 in the direction of the arrow 25, whereupon extension spring 45 facilitates the retraction of movable jaw 12 away from fixed jaw 22.

To minimize the hazard of shock to the user of the device, it is preferred that body 19 including handgrip 20, trigger handle 24 and movable jaw 12 be made of a non-conductive material, such as plastic or fiberglass. Conductor support 17 is preferably made from PVC piping. The remaining components may be made of metal or any other suitable material.

It should be noted that all operations of the trigger handle 24 and release lever 46 can be accomplished with the same hand while holding the insulation remover 10 with that hand. Either the index or middle finger is in position to actuate the release lever 46 as required while the other fingers encircle and contain the trigger handle 24 and handgrip 20.

Figure 3:
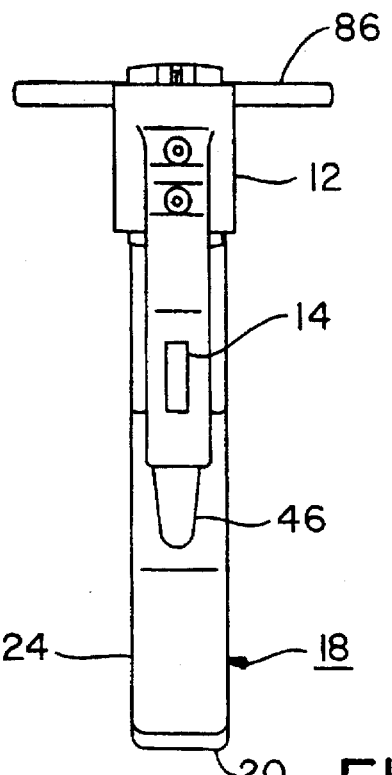
FIG. 3 is a left end view of the conductor insulation remover of FIGS. 1 and 2.
Figure 4:
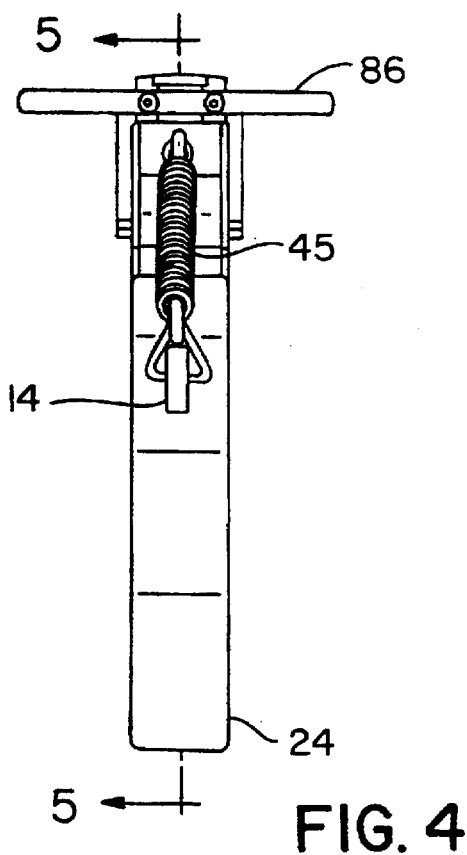
FIG. 4 is a right end view of the conductor insulation remover of FIGS. 1–3.

As best depicted in FIGS. 3 and 4, the conductor insulation remover 10 in accordance with the invention is basically flat, takes little space, and can be operated in tight places. Slide bars 14 of different lengths may be used.

The conductor jacket remover described is particularly useful in the rugged field environment. The simple construction accommodates easy disassembly, cleaning and reassembly without special tools. Use of non-conductive materials and PVC piping minimize shock hazards and results in a lightweight device. The device ensures accurate and consistent jacket removal. Unlike the tools which it replaces, the conductor jacket remover does not require a skilled operator to prepare a conductor to be spliced and minimizes the risk of damaging the conductor insulation caused by cutting into the insulation when using the prior art tools.

Although a preferred embodiment of the invention has been described herein, other variations within the scope of the invention are possible. For example, dimensions of the conductor insulation remover, particularly, conductor support 17, may be varied to accommodate various sized conductors. The invention is equally applicable to removal of insulation from sheathed members in general including vinyl clad structural members and other types of cables including co-axial cables and multiconductor cables. The materials used to construct a conductor insulation remover according to the invention can be metallic where prevention of a shock hazard is not a concern or can be made of insulating materials other than those described herein. Vinyl coated metallic construction is also possible to avoid creating a shock hazard. The remaining metallic portions of the apparatus may be covered with insulating material including a vinyl coating, to further minimize a shock hazard.

Although the present invention has been described and depicted in detail, it is clearly understood that the same is by way of illustration and example only and is not to be taken by way of limitation, the spirit and scope of the present invention being limited only by terms of the appended claims.

I claim:

1. A method for removing insulation from a conductor using an apparatus including a body, a blade mounted to the body and having a cutting edge, a blade support pivotally mounted to the body and to which the blade is mounted, a movable jaw connected to the body, a one-way drive mechanism attached to the body to incrementally advance the movable jaw toward the blade, and an actuable release lever permitting free movement of the movable jaw away from the blade upon actuation thereof, the method comprising the steps of:

positioning the apparatus so that the conductor is disposed between the movable jaw and the blade;

incrementally driving the one-way drive mechanism until the apparatus grips the conductor;

rotating the apparatus about the conductor to score the perimeter of the insulation; and actuating the release lever to release the conductor from the apparatus;

pivoting the blade support so that the cutting edge is located at an acute angle relative to a longitudinal axis of the conductor;

incrementally driving the one-way drive mechanism until the apparatus again grips the conductor;

rotating the apparatus about the conductor to helically score the perimeter of the insulation;

actuating the release lever to release the conductor from the apparatus; and removing the insulation from the conductor.

2. A method for removing insulation from a conductor using an apparatus including a body, a blade mounted to the body and having a cutting edge, a blade support pivotally mounted to the body and to which the blade is mounted, a movable jaw connected to the body, a one-way drive mechanism attached to the body to incrementally advance the movable jaw toward the blade, and an actuable release lever permitting free movement of the movable jaw away from the blade upon actuation thereof, the method comprising the steps of:

positioning the apparatus so that the conductor is disposed between the movable jaw and the blade;

pivoting the blade support so that the cutting edge is located at an acute angle relative to a longitudinal axis of the conductor;

incrementally driving the one-way drive mechanism until the apparatus grips the conductor;

rotating the apparatus about the conductor to helically score the perimeter of the insulation;

actuating the release lever to release the conductor from the apparatus; and removing the insulation from the conductor.

3. An apparatus for removing insulation from a conductor comprising:

a body;

a blade mounted to the body and having a cutting edge;

a movable jaw connected to the body;

a one-way drive mechanism attached to the body to incrementally advance the movable jaw toward the blade; and an actuable release lever permitting free movement of the movable law away from the blade upon actuation thereof;

wherein the movable law and the blade grip the conductor therebetween so that the cutting edge penetrates the insulation, whereupon rotation of the apparatus about the conductor results in scoring of the perimeter of the insulation to permit removal thereof wherein the body includes a fixed jaw and a blade support pivotally mounted to the body at the fixed jaw, the blade being releasably secured to the blade support.

4. An apparatus according to claim 3, wherein pivotal movement of the blade support selectively positions the blade with the cutting edge substantially perpendicular to a longitudinal axis of the conductor, and with the cutting edge at a predetermined acute angle with respect to the longitudinal axis of the conductor.

5. An apparatus according to claim 3, further comprising a directional bar rigidly mounted to the blade support, wherein movement of the directional bar permits pivoting of the blade support relative to the fixed jaw.

6. An apparatus for removing insulation from a conductor, comprising:

a body;

a blade mounted to the body and having a cutting edge;

a movable jaw connected to the body;

a one-way drive mechanism attached to the body to incrementally advance the movable law toward the blade; and an actuable release lever permitting free movement of the movable law away from the blade upon actuation thereof;

wherein the movable jaw and the blade grip the conductor therebetween so that the cutting edge penetrates the insulation, whereupon rotation of the apparatus about the conductor results in scoring of the perimeter of the insulation to permit removal thereof further comprising a blade positioning means for selectively positioning the blade with the cutting edge substantially perpendicular to a longitudinal axis of the conductor, and with the cutting edge at a predetermined acute angle with respect to the longitudinal axis of the conductor.

7. An apparatus for removing insulation from a conductor, comprising:

a body;

a blade mounted to the body and having a cutting edge;

a movable jaw connected to the body;

a one-way drive mechanism attached to the body to incrementally advance the movable jaw toward the blade; and an actuable release lever permitting free movement of the movable jaw away from the blade upon actuation thereof;

wherein the movable jaw and the blade grip the conductor therebetween so that the cutting edge penetrates the insulation, whereupon rotation of the apparatus about the conductor results in scoring of the perimeter of the insulation to permit removal thereof, further comprising a slide bar rigidly attached to the movable jaw at a first end thereof, the slide bar being movable to bring the movable jaw toward and away from the blade.

8. An apparatus according to claim 7, further comprising an extension spring for biasing the movable jaw away from the blade upon actuation of the release layer, the extension spring mounted at one end to the blade and at the other end to the slide bar.

9. An apparatus according to claim 8, wherein the slide bar includes a u-shaped recess at a second end thereof adapted to receive the other end of the extension spring.

10. An apparatus according to claim 9, wherein the body includes a fixed jaw to which the blade is mounted, the fixed jaw including a projection to which the extension spring is mounted.

11. An apparatus according to claim 8, wherein the movable jaw includes a PVC support portion mounted thereto to facilitate rotation of the apparatus about the conductor.

12. An apparatus according to claim 11, wherein the conductor is received between the PVC hook portion and the blade.

13. An apparatus for removing insulation from a conductor, comprising:

a body;

a blade mounted to the body and having a cutting edge;

a movable jaw connected to the body;

a one-way drive mechanism attached to the body to incrementally advance the movable jaw toward the blade; and an actuable release lever permitting free movement of the movable jaw away from the blade upon actuation thereof;

wherein the movable jaw and the blade grip the conductor therebetween so that the cutting edge penetrates the insulation, whereupon rotation of the apparatus about the conductor results in scoring of the perimeter of the insulation to permit removal thereof;

further comprising a trigger handle pivotally mounted to the body and wherein the one-way drive mechanism includes a driving lever permitting incremental advancement of the movable jaw upon pivotal movement of the trigger handle.

14. An apparatus according to claim 13, further comprising a slide bar rigidly attached to the movable jaw at a first end thereof, the slide bar being movable to bring the movable jaw toward and away from the blade, wherein the driving lever permits incremental advancement of the slide bar upon pivotal movement of the trigger handle.

15. An apparatus according to claim 14, wherein incremental advancement of the slide bar closes said movable jaw relative to the blade.

16. An apparatus for removing insulation from a conductor, comprising:
   a body;
   a fixed jaw mounted to the body;
   a blade mounted to the fixed jaw;
   a trigger handle pivotally mounted to the body;
   a movable jaw;
   a slide bar, the movable jaw being mounted on one end of the slide bar, the slide bar being movable to bring the movable jaw toward and away from the fixed jaw;
   one-way drive means for incrementally advancing the slide bar and the movable jaw toward the fixed jaw, the one-way drive means including a driving lever permitting incremental advancement of the slide bar upon pivotal movement of the trigger handle and an actuable release lever, the actuable release lever permitting free movement of the slide bar upon actuation thereof; and
   means for biasing the movable jaw away from the fixed jaw upon actuation of the release lever.

17. An apparatus according to claim 16, further comprising a blade support pivotally mounted to the body; the blade being rigidly mounted to the blade support.

18. An apparatus according to claim 17, further comprising means for pivoting the blade support relative to the body.

19. An apparatus according to claim 17, wherein the blade support includes two grips within which the blade is releasably secured.

20. An apparatus according to claim 17, wherein the blade is releasably mounted to the blade support.

21. An apparatus for removing insulation from a conductor, comprising:
   a body including a fixed jaw and a blade support pivotally mounted to the body at the fixed jaw;
   a blade releasably secured to the blade support and having a cutting edge;
   a movable jaw connected to the body; and
   a mechanism attached to the body to incrementally advance the movable jaw toward the blade;
   wherein the movable jaw and the blade grip the conductor therebetween so that the cutting edge penetrates the insulation, whereupon rotation of the apparatus about the conductor results in scoring of the perimeter of the insulation to permit removal thereof.

22. An apparatus according to claim 21, further comprising an actuable release lever permitting free movement of the movable jaw away from the blade upon actuation thereof and an extension spring biasing the movable jaw away from the blade upon actuation of the release lever.

23. An apparatus according to claim 22, further comprising a slide bar rigidly attached to the movable jaw at a first end and including a u-shaped recess at a second end thereof, the slide bar being movable to bring the movable jaw toward and away from the blade, the extension spring mounted at one end to the body adjacent the blade and at the other end to the u-shaped recess of the slide bar.

24. An apparatus according to claim 23, said fixed jaw including a projection to which the extension spring is mounted.

25. An apparatus according to claim 21, further comprising a slide bar rigidly attached to the movable jaw at a first end thereof, the slide bar being movable to bring the movable jaw toward and away from the fixed jaw.

26. An apparatus according to claim 21, further comprising a trigger handle pivotally mounted to the body and wherein the mechanism includes a driving lever permitting incremental advancement of the movable jaw upon pivotal movement of the trigger handle.

27. An apparatus for removing insulation from a conductor, comprising:
   a fixed jaw,
   a blade support pivotally mounted to the fixed jaw,
   a blade releasably secured to the blade support and having a cutting edge;
   a movable jaw;
   a mechanism for advancing the movable jaw toward the blade; and
   a blade positioning mechanism for selectively positioning the blade with the cutting edge substantially perpendicular to a longitudinal axis of the conductor, and with the cutting edge at a predetermined acute angle with respect to the longitudinal axis of the conductor;
   wherein the conductor is gripped between the movable jaw and the blade so that the cutting edge penetrates the insulation, whereupon rotation of the apparatus about the conductor results in scoring of the perimeter of the insulation to permit removal thereof.

28. An apparatus according to claim 27, wherein selectively positioning the cutting edge at the predetermined acute angle results in helical scoring of the perimeter of the insulation.

29. An apparatus according to claim 27, wherein the blade positioning mechanism comprises a directional bar rigidly mounted to the blade support, the blade being releasably secured to the blade support, and wherein movement of the directional bar permits pivoting of the blade support relative to the fixed jaw.

* * * * *